No. 847,803. PATENTED MAR. 19, 1907.
T. W. MORGAN.
SPINDLE STEP BEARING.
APPLICATION FILED DEC. 14, 1906.
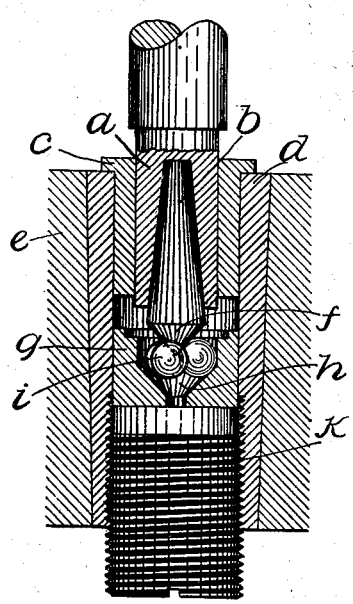
WITNESSES:
INVENTOR
Thomas W. Morgan,
BY
G. C. Kennedy,
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

SPINDLE STEP-BEARING.

No. 847,803.   Specification of Letters Patent.   Patented March 19, 1907.

Application filed December 14, 1906. Serial No. 347,789.

*To all whom it may concern:*

Be it known that I, THOMAS W. MORGAN, a citizen of the United States of America, and a resident of Waterloo, Blackhawk county, Iowa, have invented certain new and useful Improvements in Spindle Step-Bearings, of which the following is a specification.

My invention relates to improvements in spindle step-bearings; and the object of my improvement is to provide a bearing for a spindle end so arranged that the antifriction-balls which are interposed between said spindle end and said bearing may race therebetween without any dragging friction in their course. This object I have accomplished by the means which are hereinafter described and claimed and which are illustrated in the accompanying drawing, which represents a vertical central axial section of my improved spindle step-bearing arranged and adapted to effect the improvement hereinbefore alluded to.

The bearing-block $g$ is seated within a hollow bushing $d$, whose periphery is tapered to fit a tapered opening in the frame $e$. The lower part of said bushing has an interior thread, within which works the adjusting-screw $k$, by which the bearing-block $g$ is supported and adjusted. A hollow cylindrical plug $c$ is fitted within the upper part of the opening in the bushing $d$ and supported in such position by means of a peripheral flange resting on the top edge of said bushing. The bearing-seat $h$ in the bearing-block $g$ has its lower bearing-surface inclined at a certain angle to the horizontal for a purpose to be hereinafter described. This bearing-seat $h$ forms a raceway for the antifriction-balls $i$, the latter supporting the lower end of the spindle. The spindle $a$ has a socket in its lower end tapering upwardly to form a seat for the removable bearing-point $b$, whose body is of the form of a truncated cone. The lower end of the bearing-point $b$ has a downwardly-directed portion $f$ of a conical form. The conical point $f$ is the portion of the bearing-point $b$ which contacts with the antifriction-balls $i$. The inside wall of the bearing-seat $h$ is given the same angle as that of the conical end $f$ of the bearing-point $b$. The most preferable angle for this purpose is that of forty-five degrees; but any other angle can be used as desired.

When the spndle $a$ is rapidly rotating, if it should oscillate the point $f$ will always remain in contact with all the balls $i$, since the conical bearing-seat $h$ permits such balls to change their position therein without altering their relative position to said bearing-point. The balls are thus always in bearing contact with such point, and the whole runs without frictional variation.

Having described my invention, what I claim as new, and desire to secure by Letters Patent, is—

1. A spindle step-bearing, composed of the combination with a spindle having a conical bearing-point, of a conical bearing-seat whose angle to the axis is the same as that of the bearing-point, and antifriction-balls therebetween.

2. A spindle step-bearing, composed of the combination of a spindle, a removable bearing-point in said spindle having a conical bearing end, a conical bearing-seat of the same angle as the conical bearing end of said spindle, and antifriction-balls therebetween.

3. A spindle step-bearing, composed of the combination with a spindle having a conical bearing-point, of a vertically-adjustable conical bearing-seat whose angle to the axis is the same as that of the bearing-point, and antifriction-balls therebetween.

4. A spindle step-bearing, composed of the combination of a spindle, a removable bearing-point in said spindle having a conical bearing end, a vertically-adjustable conical bearing-seat of the same angle as the conical bearing end of said spindle, and antifriction-balls therebetween.

Signed at Waterloo, Iowa, this 26th day of November, 1906.

THOMAS W. MORGAN.

Witnesses:
M. E. KENNEDY,
G. O. KENNEDY.